United States Patent [19]

Van der Velde et al.

[11] Patent Number: 4,666,244
[45] Date of Patent: May 19, 1987

[54] FLAT TYPE OPTICAL CABLE AND AN OPTICAL CABLE COMPOSED OF SEVERAL FLAT TYPE CABLES

[75] Inventors: Hendrik S. Van der Velde, Alphen a/d Rijn; Klaus B. Schildbach; Johan Van der Maaden, both of Eindhoven, all of Netherlands

[73] Assignee: U.S. Philips Corporation, New York, N.Y.

[21] Appl. No.: 737,294

[22] Filed: May 23, 1985

[30] Foreign Application Priority Data

May 23, 1984 [NL] Netherlands ............... 8401642
Nov. 29, 1984 [NL] Netherlands ............... 8403629

[51] Int. Cl.⁴ ................................. G02B 6/44
[52] U.S. Cl. ...................... 350/96.23; 350/96.34
[58] Field of Search .......... 350/96.23, 96.24, 96.34

[56] References Cited

U.S. PATENT DOCUMENTS

| | | | |
|---|---|---|---|
| 3,736,217 | 5/1973 | Nagao ................... | 428/292 |
| 4,147,407 | 4/1979 | Eichenbaum et al. ........ | 350/96.23 |
| 4,176,910 | 12/1979 | Nöethe .................. | 350/96.24 |
| 4,355,863 | 10/1982 | Aulich et al. ............ | 350/96.15 |
| 4,390,238 | 6/1983 | Van der Hoek ............ | 350/96.23 |
| 4,472,019 | 9/1984 | Bishop et al. ........... | 350/96.23 |
| 4,547,040 | 10/1985 | Yamamoto et al. .......... | 350/96.34 |
| 4,557,562 | 12/1985 | Ohmori et al. ........... | 350/96.34 |

FOREIGN PATENT DOCUMENTS

| | | | |
|---|---|---|---|
| 3144205 | 5/1983 | Fed. Rep. of Germany ... | 350/96.23 |
| 54403 | 5/1981 | Japan ................... | 350/96.23 |
| 89710 | 6/1982 | Japan ................... | 350/96.23 |
| 1578680 | 11/1980 | United Kingdom . | |

OTHER PUBLICATIONS

Randall et al; "Designing Fiberoptic Cable"; *Laser Focus;* vol. 14, No. 4; Apr. 1978; pp. 56–59.
Suzuki et al; "Flat Type Cable with Silicon Clad Optical Fibers"; *Trans. of the IECE of Japan;* vol. E-61, No. 3; Mar. 1978; pp. 175–177.

*Primary Examiner*—Robert E. Wise
*Attorney, Agent, or Firm*—Marc D. Schechter

[57] ABSTRACT

A flat type optical cable comprises parallelly extending optical fibers which are interconnected by a light-cured lacquer of acrylic acid esters. The lacquer is present only on the facing circumferential parts of the optical fibers.

2 Claims, 3 Drawing Figures

4,666,244

FLAT TYPE OPTICAL CABLE AND AN OPTICAL CABLE COMPOSED OF SEVERAL FLAT TYPE CABLES

BACKGROUND OF THE INVENTION

The invention relates to an optical flat type cable in which several parallel optical fibers situated in a flat plane are bonded together.

Such a cable is known from German Offenlegungsschrift No. 2724536 (corresponding to United Kingdom Patent No. 1,578,680). It is stated that, although the cable has a good flexibility, it has on the other hand a low strength and breaks easily. It is suggested in the above-mentioned German Offenlegungsschrift to provide each fiber with a fixed or loose protective cover and to provide thereon a cover of a soft synthetic resin. The fibers are interconnected via the soft synthetic resin. If desired, an adhesive may be used.

The use of extra covers, such as that of the soft synthetic resin, causes the manufacture of the flat type optical cable to consume more time and effort and hence to become more expensive. Moreover, as a result of the extra covers, extra forces will also occur, for example, as a result of bending of the cable or of temperature variations. As a result of this, an extra signal loss will occur.

SUMMARY OF THE INVENTION

It is an object of the invention to provide a flat type optical cable in which the optical fibers supplied by the manufacturer and commercially available are processed directly, hence without extra covers.

Another object of the invention is to provide a flat type optical cable which is very flexible and moreover has a good mechanical strength.

According to still another object a flat type optical cable is provided in which the signal loss of the optical fibers as a result of the processing to form a flat type cable, is extremely low.

A further object of the invention is to provide an optical cable in which a number of flat type optical cables have been combined.

Still a further object is to provide an efficacious, method of manufacturing a flat type optical cable.

According to the invention these objects are achieved by a flat type optical cable in which the optical fibers are interconnected by a light-cured lacquer of acrylic acid esters which is present only on the facing circumferential parts of the optical fibers.

The optical fibers in the cable according to the invention engage each other or engage each other substantially. This means that the spacing between the fibers is at most 10 μm.

The lacquer of acrylic acid esters, prior to curing, comprises a mixture of mono-, di-, tri- and/or tetraesters of acrylic acid to which other light-curable ingredients such as N-vinylpyrrolidone may have been added. The lacquer comprises an initiator, for example, a benzoin isobutyl ether which is commercially available under the trade name Irgacure. Examples of useful acrylic acid esters are alkenediol acrylates, such as 1,6-hexanediol diacrylate, alkene glycol diacrylates, such as tripropylene glycol diacrylate, trimethylol propane triacrylate, polyester acrylates, epoxy acrylate and urethane acrylate.

The invention also relates to an optical cable which comprises a number of stacked flat type optical cables as described above. The stack is twisted about its longitudinal axis and is surrounded by a loose tubular cover. The cover is usually a tube of a synthetic resin. The cover may comprise reinforcing elements, such as longitudinally extending reinforcing wires or reinforcing fibers, for example polyaramide fibers or steel wires. Further protective covers or an armor may be provided around the cover. Several optical cables may also be grouped together and may be provided with one or more common covers or a common armor.

The optical cable according to the invention excels by its simple construction and inexpensive method of manufacture and hence is very suitable for practical use on a large scale.

The invention further relates to method of manufacturing a flat type optical cable. In the manufacturing method according to the invention, a number of parallelly extending optical fibers are guided over a first roller or system of rollers which at its surface has a layer of a light-curable lacquer. On passing over the roller, the fibers are provided on one side wth a layer of lacquer. The fibers are then guided over a second roller, or system of rollers the shaft of which is at right angles to that of the first roller or system of rollers. The fibers are rotated through an angle of 90° by the second roller, and the resulting assembly of optical fibers is exposed to light.

The special aspect of the method according to the invention is that due to the rotation of the fibers through 90°, the fiber bundle is self-calibrating. The fibers center themselves (i.e. they automatically engage each other). The lacquer is present only between the facing circumferential parts of the fibers.

So an important advantage of the method according to the invention is that no separate calibrating or centering device is necessary to get the fibers in their places (i.e. parallel against each other). Another important advantage is that the lacquer also lands in the correct place (i.e. only between the fibers).

DESCRIPTION OF THE PREFERRED EMBODIMENTS

Figure 1:
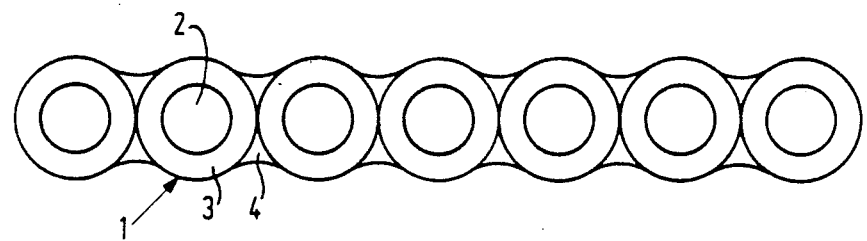
FIG. 1 is an end view of a flat type optical cable according to the invention.

Reference numeral 1 in FIG. 1 denotes an optical fiber (glass fiber) as it is marketed by the manufacturer of optical fibers. The optical fiber always consists of a glass fiber 2 which has been provided by the manufacturer with a protective layer 3, the so-called primary coating, which is usually manufactured from U.V.-light-cured acrylates. The primary coating may consist of one or two layers. Without the primary coating, the optical fiber would be damaged very rapidly. Therefore, the glass (optical) fiber is provided with the thin protective layer immediately after the manufacture thereof. The thickness of the primary coating is approximately 62 μm. The optical (glass) fiber has a diameter of 125 μm.

The optical fibers are interconnected by a light-cured lacquer 4 of acrylic acid esters which is present only on the facing parts of the fibers 1. At the area of the lacquer 4, the fibers 1 engage each other or engage each other substantially. Examples of suitable lacquer compositions (prior to curing) are:

(a)
- 25% by weight of epoxyacrylate (75% by weight solution in tripropylene glycol diacrylate),
- 35% by weight of aromatic urethane acrylate,
- 16% by weight of tripropylene glycol diacrylate,
- 16% by weight of unsaturated tertiary amine (co-initiator)
- 8% by weight of benzophenone (initiator).

(b)
- 30% by weight of epoxyacrylate (75% solution in tripropylene glycol diacrylate),
- 40% by weight of aromatic urethane acrylate,
- 25% by weight of tripropylene glycol diacrylate,
- 1% by weight of ethanol
- 4% by weight of benzildimethyl ketal (initiator).

(c)
- 58% by weight of chlorinated polyester (60% solution in 1,6-hexanediol diacrylate)
- 38% by weight of semi-ester of phthalic acid and hydroxy ethyl acrylate,
- 4% by weight of benzildimethyl ketal (initiator).

Figure 2:
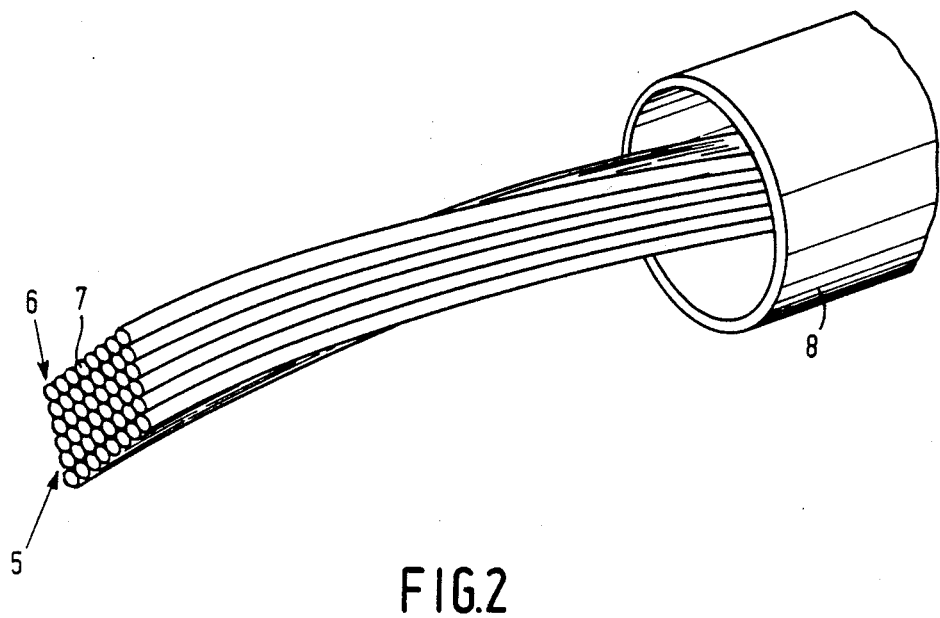
FIG. 2 is a perspective view of an optical cable according to the invention.

Reference numeral 5 in FIG. 2 denotes a pack of eight stacked flat type cables 6. Each flat type cable is in conformity with FIG. 1 with the proviso that six optical fibers 7 are incorporated in each flat type cable 6. The pack 5 is twisted about its longitudinal axis and is enveloped by a loose tubular cover 8.

Cover 8 is manufactured, for example, from metal. Cover 8 is preferably manufactured from a synthetic resin which has been formed into a tube by an extrusion process. The pack 5 is loose in cover 8. The pack has a cross-section of, for example 2.5 × 2.5 mm and the cover 8 has an inside diameter of, for example, 6–10 mm.

Figure 3:
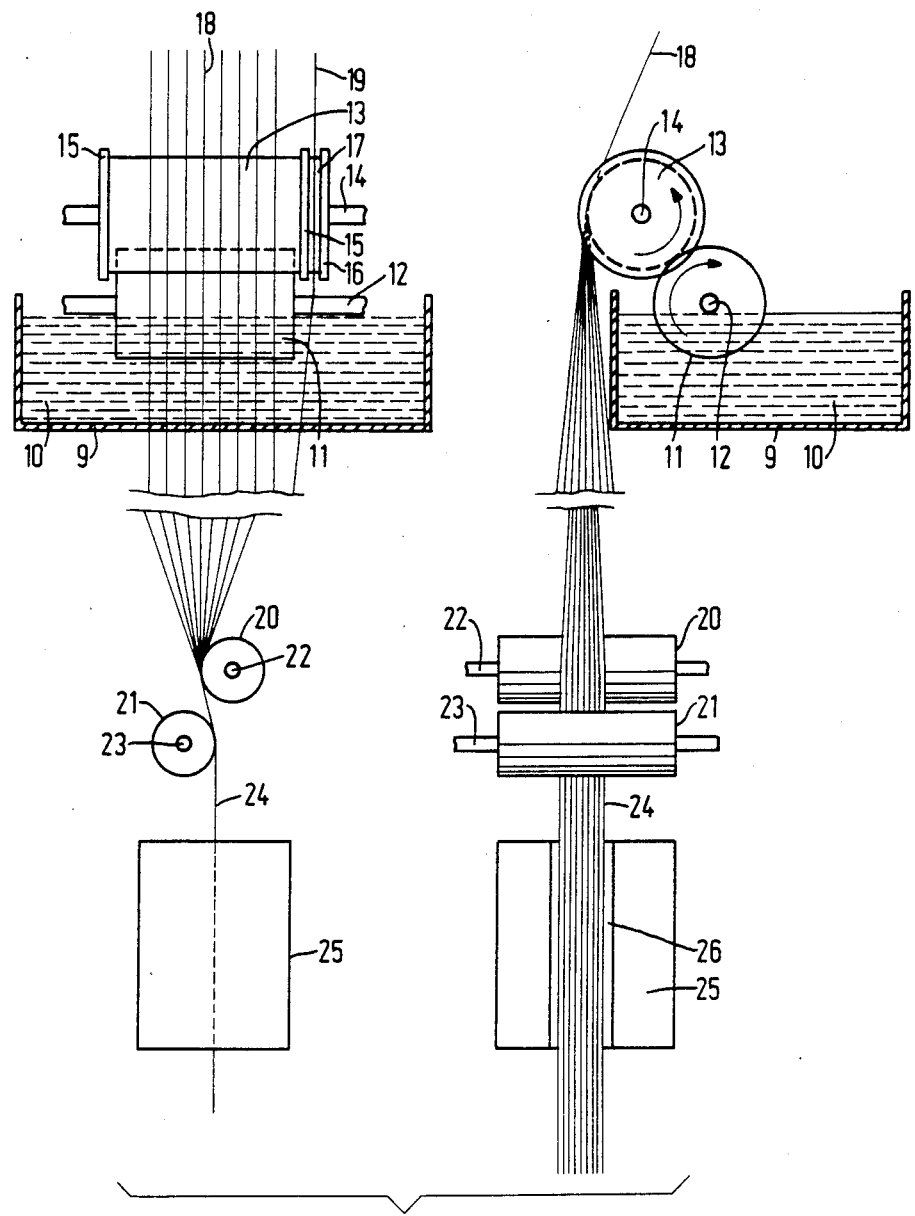
FIG. 3 schematically shows a device for carrying out the method of manufacturing a flat type cable.

FIG. 3 is composed of two parts. The left-hand part of FIG. 3 is a side elevation of the right-hand part which is a cross-sectional view of a device for carrying out the manufacturing method according to the invention.

Reference numeral 9 in FIG. 3 denotes a reservoir containing an ultraviolet light-curable lacquer composition 10. Examples of suitable lacquer compositions are listed above. A driving roller 11 on shaft 12 rotates in reservoir 9. Roller 11 is immersed, for example halfway, in the liquid lacquer 10. The rate of rotation is by way of example 30 r.p.m.

Parallel to driving roller 11 a lacquer roller 13 on shaft 14 is provided. The spacing between lacquer roller 13 and driving roller 11 is approximately 0.1 mm. Lacquer roller 13 hence is provided with a layer of lacquer, not shown via driving rollers 11.

Lacquer roller 13 has two flanges 15. The surface of lacquer roller 13 provided with a layer of lacquer is present between the flanges 15. A flange 16 ensures that the part 17 of lacquer roller 13 does not have a layer of lacquer.

Nine optical fibers 18 and 19 are guided over lacquer roller 13 at a speed of, for example, 40–70 meters per minute. The fibers, except for the outermost fiber 19, are consequently provided on one side with a layer of lacquer.

The fibers are then guided over two guide rollers 20 and 21, respectively. The shafts 22 and 23 of the guide rollers are at right angles to the shaft 14 of the lacquer roller 13. As a result of this, the fibers are rotated through a quarter of a turn so that the circumferential parts of the fibers which are provided with lacquer are now made to face each other. The lacquer is now present between the fibers. It is furthermore achieved that the fibers will center themselves and will engage each other or will engage each other substantially.

The bundle of fibers 24 thus formed is then exposed to light. The bundle traverses an exposure zone 26 bounded by U.V.-lamps. As a result of this, the lacquer is cured and a flat type cable similar to that shown in FIG. 1 is obtained. The resulting flat type cable is extremely flexible, has a good mechanical rigidity and shows an extremely low signal loss with respect to the loose optical fibers (not processed to form a flat type cable) of 0.09 dB per km.

What is claimed is:

1. A flat type optical cable comprising:
several parallelly extending optical fibers arranged in a flat plane; and
means for bonding together adjacent fibers, said bonding means comprising a light-cured lacquer of acrylic acid esters present only on facing circumferential parts of the optical fibers.

2. An optical cable comprising:
a stack of flat type optical cables having a longitudinal axis, said stack being twisted about its longitudinal axis; and
a loose tubular cover surrounding the stack of cables;
characterized in that each flat type optical cable comprises:
several parallelly extending optical fibers arranged in a flat plane; and
means for bonding together adjacent fibers, said bonding means comprising a light-cured lacquer of acrylic acid esters present only on facing circumferential parts of the optical fibers.

* * * * *